United States Patent [19]

Kasiewicz

[11] 4,164,664
[45] Aug. 14, 1979

[54] CONTROL CIRCUIT FOR LOAD-LEVELING SHOCK ABSORBERS

[76] Inventor: Stanley J. Kasiewicz, 29852 Springhill Dr., Southfield, Mich. 48076

[21] Appl. No.: 860,276

[22] Filed: Dec. 13, 1977

[51] Int. Cl.² .............................. H01H 35/38
[52] U.S. Cl. .................... 307/118; 307/10 R; 280/707; 280/DIG. 1; 91/35; 307/246
[58] Field of Search ................ 307/118, 10 R, 246; 280/707, 6 H, 6.1, 6 R, DIG. 1; 91/35

[56] References Cited
U.S. PATENT DOCUMENTS

| | | | |
|---|---|---|---|
| 3,681,671 | 8/1972 | Elliott | 307/118 |
| 3,830,138 | 8/1974 | Joneleit | 91/35 |
| 4,017,099 | 4/1977 | Hegel | 280/707 |

*Primary Examiner*—L. T. Hix
*Assistant Examiner*—S. D. Schreyer

*Attorney, Agent, or Firm*—Reising, Ethington, Barnard, Perry & Brooks

[57] ABSTRACT

A control circuit for an air-spring shock absorber controls pressurization or depressurization of the air chamber of the shock absorber in response to the output signal condition of a level sensor. The control circuit includes a first signal path that conditions the operation of an air pump for pressurizing the air chamber, and a second signal path that conditions the operation of an exhaust valve for depressurizing the air chamber. A timing circuit delays the enablement of the air pump and exhaust valve until the level sensor output signal condition associated with the actuation of the pump or valve has existed for a minimum predetermined time period. The timing circuit includes an R-C time delay circuit with an instant reset to avoid cumulative signal build-up. The control circuit is comprised of a set of digital logic gates which are preferably implemented by standard integrated circuit chips.

4 Claims, 2 Drawing Figures

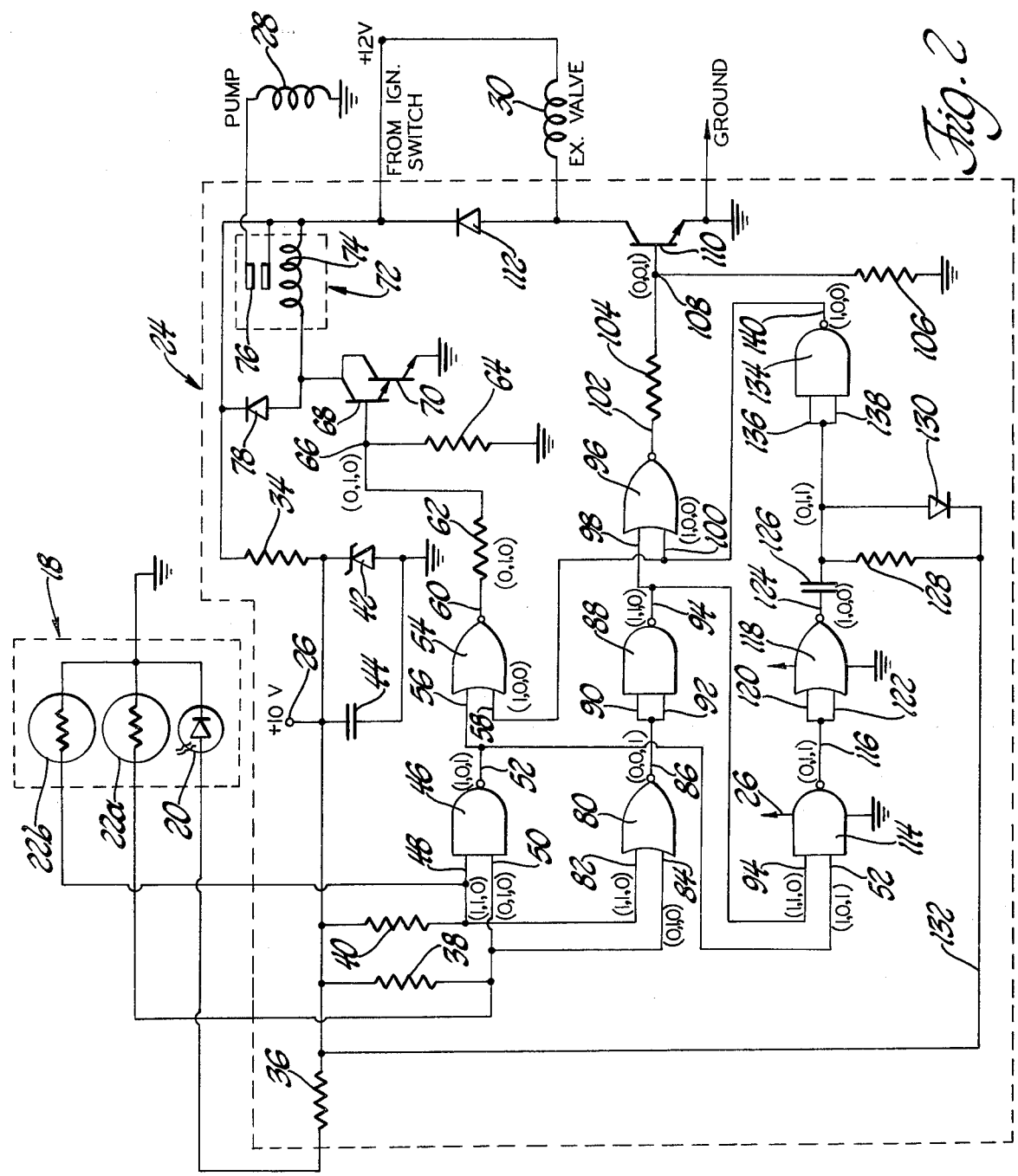
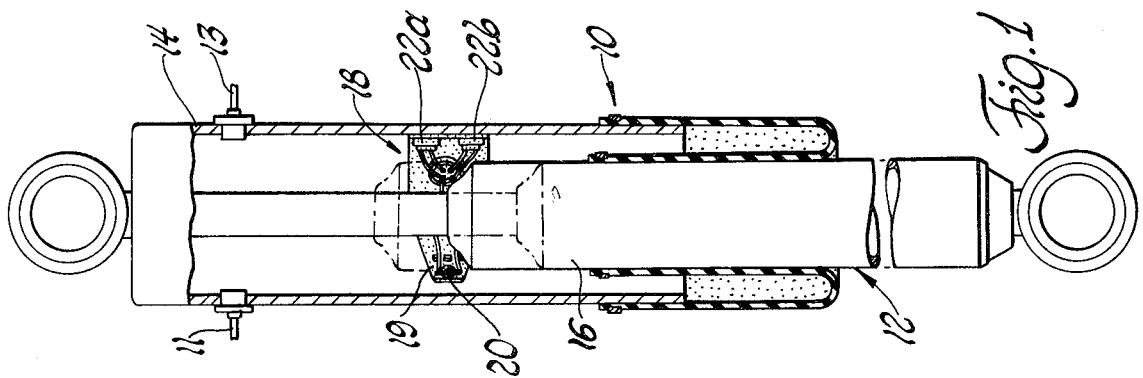

CONTROL CIRCUIT FOR LOAD-LEVELING SHOCK ABSORBERS

CROSS-REFERENCE TO RELATED APPLICATIONS

This application is related to copending application filed on Dec. 12, 1977 by Stanley J. Kasiewicz and James R. Van Sickle and entitled "Level Sensor For An Air-Spring Shock Absorber", U.S. Ser. No. 860,020.

BACKGROUND OF THE INVENTION

1. Field of the Invention

The present invention relates to a control circuit that controls the actuation of means for pressurizing or depressurizing a fluid-pressurized shock absorber in response to a sensor signal indicating the need for a change in pressure.

2. Description of the Prior Art

Load-leveling devices are used on vehicles subjected to varying load conditions to maintain a permissible body-to-axle distance for the vehicle. A common form of load-leveling device is an air-spring shock absorber which uses a pressurized air chamber to provide a spring-like effect. The pressure within the air chamber may be increased or decreased to adapt to varying load conditions. Generally, the air chamber is provided with an inlet valve and outlet valve to allow for the admission of air, such as by a pump, and release of air, such as by an exhaust valve, to and from the air chamber. The pressurized chamber is commonly provided with a sensor or detector that monitors the loading of the shock absorber with respect to a permissible range of body-to-axle distances. The sensor will provide a first signal condition when the shock absorber is overloaded, a second signal condition when under-loaded, and a third signal condition when properly loaded. Control circuits of various designs are known in the prior art to control the operation of the pressurization means and depressurization means in response to the various signal conditions from the detector. More specifically, the circuits respond to an overload or underload signal condition to turn on the pump or the exhaust until the axle-to-body distance is brought back within a permissible range. A control system of this type is disclosed in the Elliott U.S. Pat. No. 3,575,442.

It is also known in the prior art to provide a control system which discriminates between static and dynamic loading effects. More specifically, control circuits are provided with time delays so as to respond only to changes in static loading of the vehicle, and not to changes related to transient, dynamic loading effects. Examples of the latter are when the vehicle attitude changes through coming to a sudden stop or cornering around a long bend. Control circuits of this type are shown in the Boyer U.S. Pat. No. 3,633,935, Ciolli U.S. Pat. No. 3,727,941 and the Joneleit U.S. Pat. No. 3,830,138. Moreover, it is known to provide a control circuit which is reset so that successive transitory signals do not cause a signal buildup and a spurious pressurization or depressurization of the air chamber. Such a circuit is shown in Joneleit U.S. Pat. No. 3,873,123.

The control circuits of the prior art which are adapted to discriminate between steady-state and transitory load changes are of complicated and costly design. For example, the Joneleit U.S. Pat. No. 3,873,123 discloses a circuit which is implemented in discrete semiconductor devices and electromechanical relays. The Joneleit U.S. Pat. No. 3,830,138 describes a system which uses a combination of integrated circuit components and discrete components along with several electromechanical relays. In particular, this circuit uses a large number of NAND gates and inverters in a logic arrangement and uses discrete components for a timing circuit. In this logic arrangement, loading of the vehicle and closure of the sensing switches results in a logic state which starts the pump and raises the vehicle. The logic state is latched on so that the vehicle continues to be raised until the upper limit switches are closed which results in a logic state which opens the exhaust valves and the vehicle is lowered until the upper limit switches are reopened. The adjustment cycle for the case of unloading the vehicle is the reverse of that described. Accordingly, the logic is complicated and a large number of gates are required.

SUMMARY OF THE INVENTION

The present invention is a control circuit for controlling the pressurization and depressurization of a load-leveling shock absorber in response to the output signal condition of a level sensor associated with the shock absorber. The control circuit includes time delay circuitry for assuring that the pressure in the shock absorber is adjusted only after the level sensor signal condition has existed for a minimum, predetermined time duration to prevent dynamic loading effects from influencing the pressurization. Moreover, the time delay circuitry includes an instant reset feature to prevent cumulative signal buildup from dynamic loading effects.

More specifically, the disclosed embodiment takes the form of a circuit having first and second logical signal paths or control channels for conditioning the actuation of an air pump and exhaust valve, respectively, in response to an appropriate output signal condition of the level sensor. A timing circuit forestalls the enablement of the air pump and exhaust valve until the signal condition from the level sensor has sustained for the minimum, predetermined time duration. The timing circuit includes an R-C delay network that charges through a time constant related to the minimum, predetermined time duration. A diode shunt becomes forward biased if the signal condition of the level sensor changes during the charging of the R-C network to quickly discharge the capacitor to effectively provide an instant reset of the timing circuit. The instant reset feature protects against cumulative signal buildup from transitory load effects that may otherwise cause a spurious pressurization or depressurization of the shock absorber.

In the preferred form, the invention is implemented with a plurality of logic gates in the design of the first and second control channels and timing circuit. The logic gate construction takes advantage of integrated circuit technology to achieve simplification in circuit design and reduction in production costs. In the disclosed embodiment, the control logic is implemented through use of one quad-NAND chip and one quad-NOR chip.

Other advantages of the present invention will be readily appreciated as the same becomes better understood by reference to the following detailed description when considered in connection with the accompanying drawings.

BRIEF DESCRIPTION OF THE DRAWINGS

FIG. 1 is a diagrammatic view of an air-spring shock absorber taken in partial section to illustrate a level sensor, and FIG. 2 is a schematic illustration of the control circuit of the present invention shown in conjunction with the level sensor of FIG. 1.

DETAILED DESCRIPTION OF A SPECIFIC EMBODIMENT

With reference to FIG. 1, an air-spring shock absorber, shown generally at 10, is representative of the load-leveling device for which the control circuit of the present invention is adapted. In broad overview, the air-spring shock absorber includes a piston-cylinder arrangement 12 for the damping out of road vibration, and an air-spring defined by the pressurized volume 15 within dust tube 14. The dust tube 14 is provided with an air inlet valve 11 and outlet valve 13 to allow for the inflation or deflation of air to adjust the pressure within the tube 14 to accommodate varying vehicle load conditions.

The loading of the air-spring is monitored by a detector unit, shown generally at 18. The function of the detector unit 18 is to output a first signal condition when the shock absorber 10 is overloaded and in need of additional pressurization; a second signal condition when underloaded and in need of depressurization; and a third signal condition when properly loaded and without need for adjustment of the pressurization. A detector unit 18 meeting these specifications is shown and described in a copending application filed on Dec. 12, 1977 by Stanley J. Kasiewicz and James R. Van Sickle and entitled "Level Sensor for An Air-Spring Shock Absorber", U.S. Ser. No. 860,020.

More specifically, the detector unit 18 comprises a light emitting diode (LED) 20 mounted at one end of a resilient support plate 19 and first and second photoresistors 22a and b mounted at the other end. The photoresistors 22a and b are spaced above and below the LED 20 with respect to the axial dimension of the shock absorber 10. The first and second photoresistors 22a and b are shuttered from or exposed to the light of the LED 20 depending upon the relative position of a fluid reserve tube 16. The desired relative position of the fluid reserve tube 16 is such that it shutters light to the second photoresistor 22b, and leaves uninterrupted the light to the first photoresistor 22a, i.e., the air-spring is within a permissible range of loading when the fluid reserve tube blocks off light to the lower photoresistor and allows the exposure of light to the upper photoresistor. In the overloaded condition, the relative position of the fluid reserve tube tends to block the light from the LED 20 to both the first and second photoresistors 22a and b, as is indicated by the upper set of phantom lines in FIG. 1. In the underloaded condition, the fluid reserve tube 16 leaves uninterrupted the communication of light from the LED 20 to the first and second photoresistors 22a and b, as is indicated by the lower set of phantom lines.

In summary, there are three different loading conditions of the shock absorber 10, each represented by a corresponding type of signal condition being output by the detector unit 18. More specifically, an overload condition corresponds to a first signal condition where the light to both photoresistors is shuttered, an underload condition corresponds to a second signal condition where the light to both photoresistors is uninterrupted; and a permissible load condition corresponds to the light to the lower photoresistor being shuttered, and the light to the upper photoresistor being uninterrupted.

Referring now to FIG. 2, a control circuit incorporating the present invention is shown generally at 24. The control circuit 24 controls the operation of an air pump and an exhaust valve for the pressurization or depressurization of the air-spring shock absorber of FIG. 1 in response to signals from the detector unit 18.

The detector unit 18 is shown schematically in FIG. 2 in conjunction with the control circuit 24. The LED 20 is energized from a regulated voltage terminal 26 through resistor 36, with the cathode of the LED being connected to ground. The photoresistors 22a and b are similarly energized from terminal 26. The photoresistor 22a forms half of a voltage divider network with resistor 38. Likewise, the photoresistor 22b forms a voltage divider circuit with resistor 40. Both photoresistors 22a and b are biased to ground. The regulated voltage terminal is held at a nominal 10 volts by a regulator comprising a Zener diode 42 and filter capacitor 44 which are connected in shunt across the vehicle battery (12 volts) through series resistor 34.

When either photoresistor 22a or b is exposed to light energy, its conductivity will increase and resistance value decrease. Conversely, when either photoresistor 22a or b is shuttered from light energy, its conductivity will decrease and resistance value increase. Accordingly, the voltage at the common terminus of resistor 38 and photocell 22a will be a logical high or 1 when the photoresistor is shuttered, and a logical low or 0 when unshuttered. Similarly, the voltage level at the common terminus of resistor 40 and photoresistor 22b will be a logical high or 1 when the photoresistor is shuttered, and a logical low or 0 when unshuttered.

The control circuit 24 receives the output signals of detector 18 to control the operation of the pump 28 and the exhaust valve 30 for purposes of increasing or decreasing, respectively, the air pressure within the air-spring shock absorber. The control circuit is logically broken down into a first signal path or control channel for controlling the operation of the pump; a second signal path or control channel for controlling the operation of the exhaust valve; and a timing circuit that conditions the enablement of the pump or exhaust valve on the occurrence of a specific output signal condition from the detector 18 for a minimum predetermined time duration. The first signal path, second signal path, and timing circuit will presently be discussed in detail.

The first signal path includes a NAND gate 46 having first and second input terminals 48 and 50. The signal on input terminal 48 corresponds to the condition of photoresistor 22b, and the signal on input terminal 50 corresponds to the condition of photoresistor 22a. The output signal on terminal 52 of NAND gate 46 is to be regarded as a conditioning signal for the operation of the pump.

A NOR gate 54 has first and second input terminals 56 and 58. Input terminal 56 directly receives the conditioning signal from output 52. Input terminal 58 receives what is hereinafter to be regarded as an enabling signal from the timing circuit. The presence or non-presence of the enabling signal on input terminal 58 will hereinafter be discussed in connection with the description of the timing circuit. The output terminal 60 of NOR gate 54 provides the input signal to a voltage divider circuit defined by the serial connection of resistors 62 and 64.

The common terminus 66 of resistors 62 and 64 provides an input signal to the base of a first transistor 68. The emitter lead of transistor 68 is in turn connected to the base of a second power transistor 70. When the transistors 68 and 70 are energized, they in turn energize a pump relay, shown generally at 72. The pump relay includes a coil 74 that operates a contact switch 76 to control the operation of the pump. A diode 78 is provided to protect transistors 68 and 70 from reactive voltages caused by the opening and closing of contact switch 76.

The second signal path includes a NOR gate 80 having first and second input terminals 82 and 84. The input terminals 82 and 84 similarly receive the logical signal condition of the detector unit 18 in the same manner as input terminals 48 and 50 of the first signal path. The signal on output terminal 86 of NOR gate 80 is directly applied to the tied-together input terminals 90 and 92 of a NAND gate 88. The NAND gate 88 acts as an inverter, causing the signal on its output terminal 94 to be the direct invert of its input signal on terminal 86. The serial connection of NOR gate 80 and NAND gate 88 provides an effective OR gate function. The signal on output terminal 94 is to be regarded as a conditioning signal for the operation of the exhaust valve 30.

A NOR gate 96 has first and second input terminals 98 and 100. Input terminal 98 receives directly the conditioning signal from output terminal 94. Input terminal 100 receives what is to be regarded as an enabling signal from the timing circuit. The presence or non-presence of the enabling signal will hereinafter be discussed in connection with the description of the timing circuit. The output terminal 102 of NOR gate 96 provides the input signal to a voltage divider network defined by the serial connection of resistors 104 and 106.

The common terminus 108 of resistors 104 and 106 provides the input signal to the base lead of a transistor 110. Transistor 110 controls the enablement of the exhaust valve. A protective diode 112 is provided to isolate transistor 110 from the exhaust valve 30. The emitter of transistor 110 is tied to the vehicle ground.

The timing circuit will next be described. The function of the timing circuit is to delay the enablement of the pump and exhaust valve until the signal condition from the detector unit 18 indicating the need for increased or decreased pressurization has existed for a predetermined, minimum time duration. The specific purpose of this feature is to eliminate spurious operation of the pump or exhaust valve caused by dynamic loading effects, e.g. road vibration or vehicle cornering.

The timing circuit includes a NAND gate 114 that receives as input signals the output signals 52 and 94 of gates 46 and 88, respectively. NAND gate 114 is energized from the regulated voltage terminal 26 such that when its output 116 is at a logical high level it is equal to the regulated voltage magnitude. The signal output terminal 116 is input directly to the tied-together input terminals 120 and 122 of a NOR gate 118. The NOR gate 118 is similarly energized from the regulated voltage terminal 26 to cause the signal on its output terminal 124 to be at the regulated voltage level when logically high. The signal output terminal 124 of NOR gate 118 is input to one terminal of a capacitor 126. The other terminal of the capacitor connects to the parallel combination of a resistor 128 and diode 130. The common terminus of resistor 128 and diode 130 is connected by lead 132 to the regulated voltage terminal 26. The resistive-capacitive network is characterized by an R-C time constant related to the time required for the capacitor 126 to charge or discharge between logic states. The output signal condition from the detector unit 18 must exist for a time duration directly related to this R-C time constant to allow the enablement of the pump or relay by the timing circuit.

A NAND gate 134 has tied-together input terminals 136 and 138 which receive the signal level at the common terminus of capacitor 126, resistor 128, and diode 130. The NAND gate 134 functions as an inverter so that the signal on output terminal 140 is the direct inversion of its input. The output signal on terminal 140 is hereinafter termed an enabling signal. If the signal on output terminal 140 is high, it indicates that an overload or underload signal condition from detector unit 18 has persisted long enough to be regarded as attributable to a change in static loading conditions. The enabling signal on output terminal 140 is applied to input terminal 58 of NOR gate 54 and input terminal 100 of NOR gate 96 to enable those gates to allow the operation of the pump 28 and exhaust valve 30, respectively.

The operation of the control circuit 24 under normal, overloaded and underloaded operating conditions will next be discussed. As a preface to the discussion, it is to be noted that the logical signal states on each circuit input terminal and output terminal are placed within parentheses in correspondence to normal, overloaded and underloaded conditions.

Under normal loading conditions, photoresistor 22a is unshuttered, and photoresistor 22b is shuttered. Accordingly, the signals on input terminals 48 and 50 of NAND gate 46 are high and low, respectively. The signal on output terminal 52 is high, and, assuming the signal on input terminal 58 to be high, causes the signal on output terminal 60 of NOR gate 54 to be low. Consequently, the voltage at terminus 66 is low, causing the pump to be shut off.

Similarly under these conditions, the signals on input terminals 82 and 84 to NOR gate 80 are high and low, respectively, causing the signal on output terminal 86 to be low. This in turn causes the signal on output terminal 94 of NAND gate 88 to be high. The high signal on input terminal 98 to NOR gate 96, assuming input 100 to be high, causes the signal on output terminal 102 to be low. Consequently, the signal level at node 108 is low, causing the exhaust valve to be kept off.

With normal loading conditions, the signals on input terminals 52 and 94 to the timing circuit are both high. This causes the signal on output terminal 116 of NAND gate 114 to be low. The inverted signal on output terminal 124 of NOR gate 118 is then high. The voltage drop across capacitor 126 causes the signal on input terminals 136 and 138 to NAND gate 134 to be low. The low inputs yield a high signal on output terminal 140. The normally high signal on output terminal 140 applied to input terminals 58 and 100 of NOR gates 54 and 96, respectively, disables the operation of the pump and exhaust valve.

Under an overload condition, both photoresistors 22a and b will be shuttered, causing the signal inputs to the first signal path to both be high. This yields a low signal at output terminal 52 of NAND gate 46. The low output signal is directly received by input terminal 56 of NOR gate 54.

The other signal input to terminal 58 to NOR gate 54 is received from the timing circuit. With the existence of an overload condition, the signal on input terminal 52 to the timing circuit will now be low, causing the signal on output terminal 116 of NAND gate 114 to go high. The high output signal on terminal 116 is inverted by NOR gate 118 at output terminal 124. The low signal condition at output terminal 124 will cause the capacitor 126 to start to charge by the flow of current through resistor 128. If the capacitor is allowed to charge uninterrupted, then after a time interval related to the resistive-capacitive values, the signal to the input terminals 136 and 138 of NAND gate 134 will go high. A high input signal to NAND gate 134 will cause a low signal on output terminal 140. The low output is then applied to input terminal 58 of NOR gate 54. Both input terminals to NOR gate 54 are now at a low signal level, causing the signal on output terminal 60 to go high. This will in turn cause the signal level at node 66 to go high and cause transistor 68 to switch on. Transistor 68 will drive transistor 70, which will in turn drive the pump relay 72 to energize the pump.

Had the overload signal condition received from the detector unit 18 occurred for a time less than the minimum, predetermined time duration, the timing circuit would have ignored the transition in signal condition and prevented the activation of the pump. More specifically, during the time interval when capacitor 126 was being charged, had the signal on output terminal 124 of NOR gate 118 gone high, this would have resulted in a rapid discharge through diode 130. This effectively discharges any charge over a normally high state which, in this case, is due to the attempt to activate the pump. This provides an instant reset feature. In other words, a succession of false indications cannot build up in the timing circuit to cause a spurious activation of the pump.

Under an underloaded condition, both photoresistors 22a and b will be unshuttered, causing both input signals to the second signal path to be low. Specifically, the signal on input terminals 82 and 84 of NOR gate 80 will be low, causing the signal on output terminal 86 to be high. The high signal output terminal 86 is directly received by tied-together input terminals 90 and 92 of NAND gate 88. The NAND gate 88 functions as an inverter to change the high signal on input terminals 90 and 92 to a low signal output terminal 94.

NOR gate 96 receives as one input the low output signal 94 of NAND gate 88. The other signal input terminal 100 is taken as the output of the timing circuit. If the underload signal condition indicated by the detector unit 18 is of sufficient time duration in accordance with the R-C time constant of the timing circuit, then the signal on input terminal 100 will be low, as in the manner of the preceding description of the timing circuit. A pair of low input signals to NOR gate 96 will cause the output signal on terminal 102 to be high. Consequently, the signal level at node 108 will be high, energizing the transistor 110 to activate the exhaust valve.

As indicated, the timing circuit acts in cooperation with the second signal path to filter out an underload signal condition occurrence below the minimum predetermined time duration.

The invention has been described in an illustrative manner, and it is to be understood that the terminology which has been used is intended in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A control circuit for use in the pressure regulation of a pressurized load-leveling device, the load-leveling device being equipped with detector means having first and second output signals for providing a first signal condition to represent underpressurization, a second signal condition to represent overpressurization, and a third signal condition to represent proper pressurization, the control circuit comprising:

a first control channel including first logic gate means having first and second input terminals which are adapted to receive the first and second output signals of the detector means without difference as to order, and which is responsive to the first signal condition to provide a first output signal for conditioning the operation of pressurizing means to increase the pressure in the load-leveling device;

a second control channel including second logic gate means having first and second input terminals which are adapted to receive the first and second output signals of the detector means without difference as to order, and which is responsive to the second signal condition to provide a second output signal for conditioning the operation of depressurizing means to decrease the pressure in the load-leveling device; and timing circuit means, intercoupled with said first and second control channels and responsive to the occurrence of a first or second output conditioning signal from the first or second logic gate means when said first and second output conditioning signal is continuous for a minimum predetermined time duration, for providing an enabling signal to the first and second control channels, which, in conjunction with the first or second output signal, enables the operation of the pressurizing or depressurizing means, respectively.

2. The control circuit as defined in claim 1 wherein the timing circuit means comprises, third logic gate means, responsive to the occurrence of an output conditioning signal, for changing the signal level of its output in response thereto, and R-C timing network means, responsive to a change in the signal level of the output of the third gate means for developing a related signal level output through a predetermined time delay to provide an enabling signal to the control channel associated with the conditioning signal.

3. The control circuit as defined in claim 2 wherein the R-C timing network means comprises the serial connection of a resistance and capacitance, and further including reset means comprising a diode connected parallel with the resistance.

4. The control circuit as defined in claim 1 wherein the control circuit implementation includes a quad-NOR integrated circuit chip and a quad-NAND integrated circuit chip.

* * * * *